United States Patent [19]
Wilson

[11] 3,765,628
[45] Oct. 16, 1973

[54] INSTRUMENT MOUNTING CLAMP

[76] Inventor: Harold K. Wilson, 3524 Bagley Ave., North, Seattle, Wash. 98103

[22] Filed: Jan. 19, 1972

[21] Appl. No.: 218,905

[52] U.S. Cl............................. 248/27, 248/DIG. 6
[51] Int. Cl............................................ F16m 13/00
[58] Field of Search......................... 248/27, DIG. 6

[56] References Cited
UNITED STATES PATENTS

| | | | |
|---|---|---|---|
| 1,576,457 | 3/1926 | Petty | 248/DIG. 6 |
| 2,616,644 | 11/1952 | Christophersen | 248/27 |
| 2,665,094 | 1/1954 | Christophersen | 248/27 |
| 3,589,656 | 6/1971 | Protzman | 248/27 |

Primary Examiner—William M. Schultz
Attorney—Richard W. Seed et al.

[57] ABSTRACT

Instruments, such as aircraft instruments, are mounted upon a mounting panel using clamping devices which have two generally L-shaped clamping pieces surrounding an instrument, each of the clamping pieces having two legs forming respective dihedral angles at the junctures of the legs. The free end portions of each of the legs are overlapped and arranged such that the dihedral angles face one another in spaced relation. The overlapped portions of the legs each have elongated registering slots extending at cross angles to one another which are not parallel to the axis of the clamp. A pair of slide means are arranged to move parallel to the clamp axis, each of the slide means having connectors which project through the registering slots so movement of the slide means varies the overlap of the legs and, therefore, varies the size of the clamping area. Anchoring means are provided for connecting the clamping pieces to a mounting panel and adjusting screw means are connected to the slide means for selectively moving the slide means endwise to vary the clamping area and constrict the clamping pieces about the instrument.

7 Claims, 7 Drawing Figures

PATENTED OCT 16 1973
3,765,628
SHEET 1 OF 2
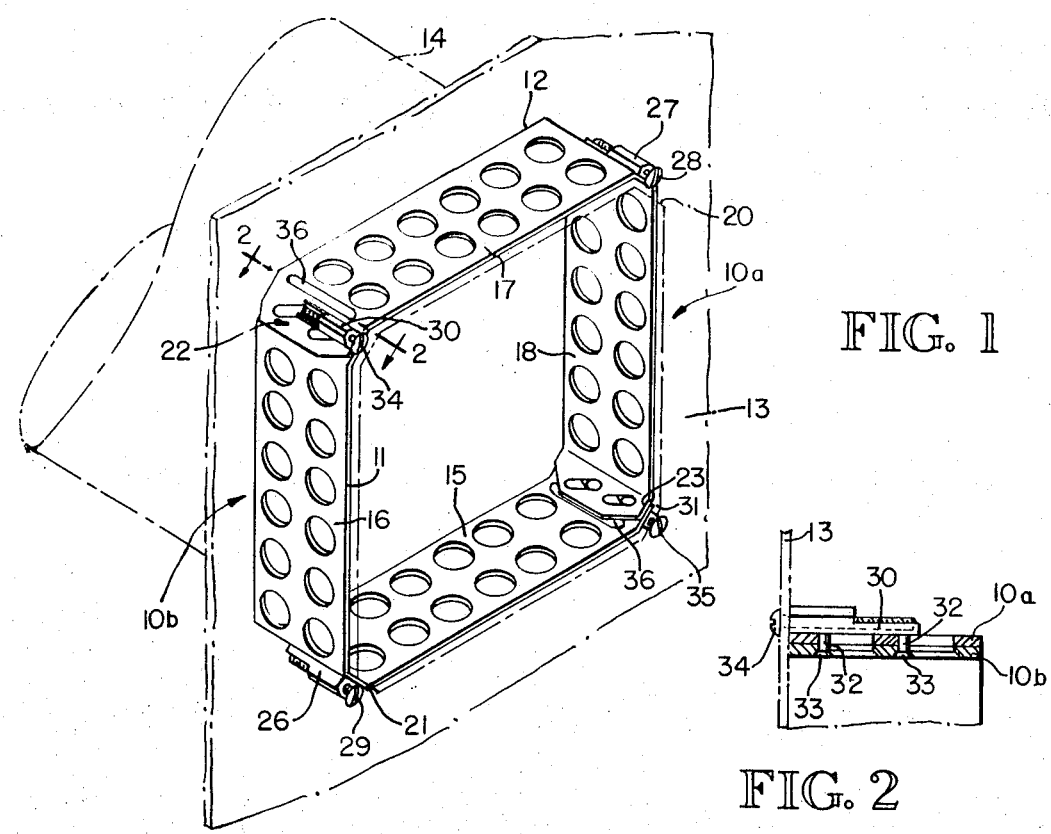
FIG. 1
FIG. 2
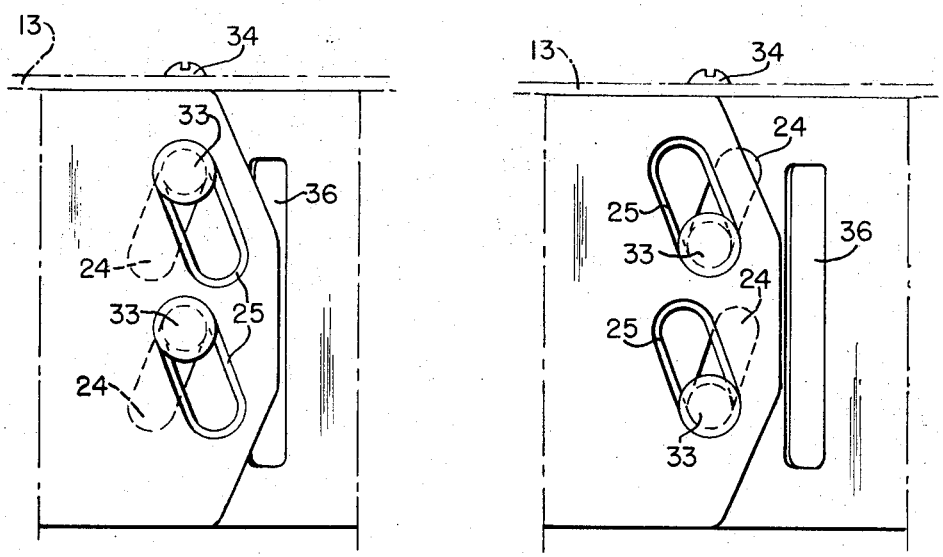
FIG. 3
FIG. 4

INSTRUMENT MOUNTING CLAMP

BACKGROUND OF THE INVENTION

1. Field of the Invention

This invention relates to a mounting clamp detachably secured to the rear of an instrument panel for releasably securing instruments to the instrument panel.

2. Prior Art Relating to the Disclosure

Instrument mountings for releasably securing instruments to an instrument panel generally comprise a split band clamp whose free ends are held together by connecting means drawing the ends of the clamp together to clamp the instrument. Patents disclosing mounting clamps include the following: U. S. Pat. Nos. 2,598,704; 2,616,644; 2,641,038; 2,679,993; 2,684,221; 2,778,085; 2,855,167; 3,171,623 and 3,261,577. Particular reference is made to U.S. Pat. No. 2,855,167 which discloses a split band clamp whose ends are held together by a connector shoe which, when drawn axially against the gaping ends of the clamp, draws the gaping ends together by a camming action. Mounting clamps of this type have been extensively used but have disadvantages which the present invention overcomes. The principal disadvantages of the clamps disclosed by U. S. Pat. 2,855,167 is that they do not provide a stable platform on which to mount the instrument. They are also relatively expensive to manufacture. Further, the density of instrumentation that can be conveniently mounted on a panel is lower than that which can be accomplished by the present clamping means.

SUMMARY OF THE INVENTION

The objects of this invention are: (1) to provide an improved mounting clamp which can be economically manufactured; (2) to provide a mounting clamp of a configuration enabling a greater density of instrumentation in an instrument panel by minimizing the space necessary between adjacent instruments received in the clamping means; (3) to provide a mounting clamp made from two generally L-shaped clamping pieces of the same size and shape; (4) to provide a mounting clamp wherein the free ends of each of the L-shaped clamping pieces overlap, with each clamping piece having elongated registering slots therein extending at cross-angles to one another which are not parallel with the clamp axis, the clamping area defined by the clamping pieces varied by slide means having projections extending through the registering slots; and (5) to provide a mounting clamp having double camming action within each slide.

BRIEF DESCRIPTION OF THE DRAWINGS

FIG. 1 is a perspective view of the instrument clamp of this invention in relation to a moutning panel and instrument shown in phantom;

FIG. 2 is a cross-sectional view along section line 2—2 of FIG. 1;

FIG. 3 is a partial view of the slide means connecting the L-shaped clamping pieces together with slide means therein moved to a reduced clamping position;

FIG. 4 is a similar view as FIG. 3 with the slide means moved to an expanded clamping position.

DESCRIPTION OF THE PREFERRED EMBODIMENTS

Figure 5:
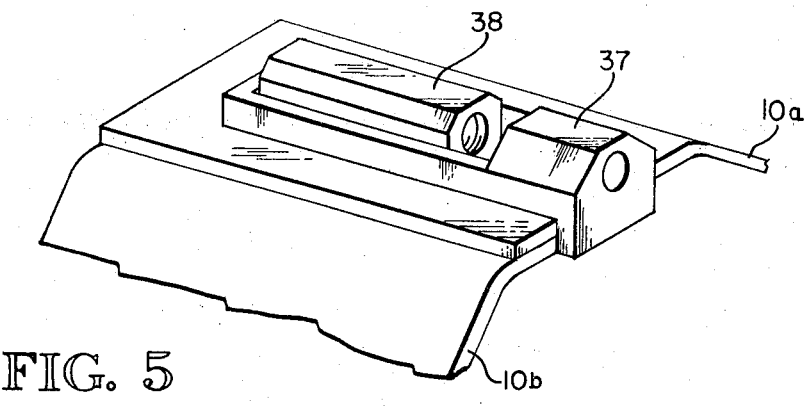
FIG. 5 is a perspective view of a modified slide means which substantially eliminates any problem of bending of the mounting panel when tightening the adjusting screws.

FIG. 1 illustrates an example of the use of the clamping device for mounting an instrument in an instrument panel. Mounting clamps of the type shown are extensively used in mounting aircraft instruments in instrument panels. The clamps illustrated comprise two generally L-shaped clamping pieces 10a and 10b of substantially uniform width, the same size and configuration. The forward and rear edges 11 and 12 of the clamping pieces may have flanges projecting radially outwardly for better insertion of the instrument. the slots The front edge 11 may bear against the rear face of a mounting panel 13 having a cutout therein for the front face of an instrument 14 which extends therethrough. Each of the clamping pieces is composed of two legs 15, 16, 17 and 18. The two legs of each clamping piece form respective dihedral angles 20 and 21 at the juncture of the pairs of legs. The ends of the pairs of legs 22 and 23 are angled to form respective dihedral angles. Each of the free ends have pairs of elongated slots 24 and 25 therein extending at an obtuse angle relative to the clamp axis. The free ends of clamping piece 10a are overlapped with the free ends of clamping piece 10b as shown in FIG. 1 so that theslots in each of the free ends register with each other and are at cross-angles to one another as shown in FIGS. 3 and 4.

Anchor lugs 26 and 27 are secured by suitable means to each of the clamping pieces at the juncture of the legs. The lugs are provided with threaded bores extending parallel to the clamp axis for receiving mounting screws 28 and 29 which pass through holes in the mounting panel. The mounting screws have heads which bear against the front face of the mounting panel.

Pairs of slide means 30 and 31 mounted at the overlapped portions of the legs have connectors projecting through the registering slots of the legs. Movement of the slide means parallel to the clamp axis varies the overlap of the legs and, therefore, the size of the clamp area. Each of the connectors has a neck portion 32 and a head portion 33 with the neck portions thereof projecting through the respective overlapped slots so that the head portions bear against the bevelled edges of the slots on the surface opposite the slide means. The slide means and anchor lugs are located on the outer side of the clamping pieces. The pairs of slots formed in each of the free ends of the clamping pieces together with the complimentary pairs of connectors provide a stable platform for the instrument being mounted.

Figure 6:
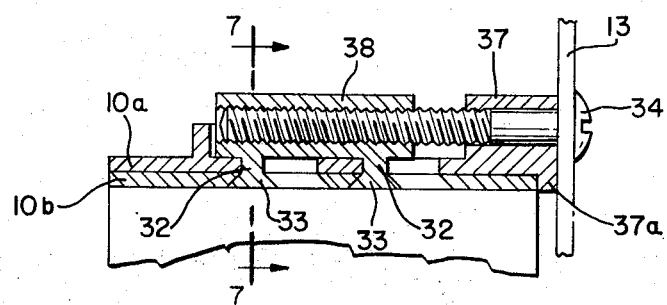
FIG. 6 is a vertical cross-section of the modified slide means of FIG. 5.
Figure 7:
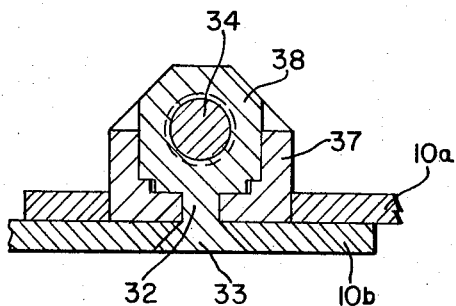
FIG. 7 is a view along section line 7—7 of FIG. 6.

FIG. 2 illustrates one form of the slide means. FIGS. 4 to 7 illustrate a modified form of the slide means which has the advantage of substantially eliminating bending of the mounting panel when tightening the adjustment screws. In FIG. 2 the slide means consists of a unitary traveling nut in sliding engagement with the overlapped portions of the clamping pieces and pairs of connectors, each having a neck portion 32 and a head portion 33 extending from the lower surface of the unitary nut. In FIGS. 4 to 7 the slide means consists of a stationary sleeve 37 having a projection 37a at the forward end thereof which leans against the forward edge of the overlapped clamping pieces. The rear portion of the stationary sleeve has a channel cut therein for receiving a threaded traveling nut 38, the traveling nut having pairs of connectors, each having a neck portion 32 and a head portion 33 extending from the lower surface thereof through the respective overlapped slots 24 and 25. Adjusting screws 34 and 35 are threaded into respective bores of the traveling nut portions. The adjusting screws pass through holes in the mounting panel, the holes being of sufficient diameter to allow movement toward or away from the center of the clamp as the adjusting screw is advanced or retracted to vary the clamping area defined by the clamping pieces. Each adjusting screw has a head which bears against the front face of the mounting panel. As the adjusting screws are rotated in the advancing direction, the respective traveling nuts are drawn toward the rear face of the mounting panel, thereby effecting a double camming action between the slots and connectors to increase the amount of overlap of the legs and reduce the clamping area to constrict the clamping pieces about the instrument being mounted.

One of the legs of each clamping piece is preferably provided with an elongated slot 36 extending parallel to the clamp axis, the slot arranged to receive the free end of the overlapping leg of the other clamping piece as shown in FIG. 4.

OPERATION

To mount an instrument using the clamping device of this invention mounting screws 28 and 29 are extended through holes in the mounting panel 13 and threadedly engaged with the respective anchor lugs 26 and 27. The screws are advanced a desired amount. The instrument is then inserted in the clamp. Adjusting screws 34 and 35 extending through the mounting panel are threadedly engaged in the threaded bores of the traveling nut portions of the slide means 30 and 31 and are advanced to reduce the clamping area and constrict the clamping pieces about the instrument.

The clamping device of this invention is of simple construction and relatively inexpensive to manufacture. The clamping pieces are of the same size and configuration and can be easily stamped and formed.

The embodiments of the invention in which a particular property or privilege is claimed are defined as follows:

1. A clamping device for securing an instrument to a mounting panel comprising:
   two generally L-shaped clamping pieces surrounding a clamping area, each having two legs forming respective dihedral angles at an apex of the juncture of the legs, the legs of the two pieces having overlapping free end portions arranged such that the dihedral angles face one another in spaced relation,
   elongated registering pairs of slots in each of the overlapping portions of the legs extending at cross angles to one another and not parallel with the clamp axis,
   a pair of slide means arranged to move endwise parallel to the clamp axis having projections extending through each of the respective registering slots whereby endwise movement of each of the slide means and projections exerts two simultaneous camming actions at spaced apart locations to vary the overlap of the legs and thereby vary the size of the clamping area,
   anchoring means anchoring said clamping pieces to a mounting plate, and
   adjusting screw means threadedly connected to the slide means through the mounting plate for selectively moving the same endwise.

2. The clamping device of claim 1 wherein each clamping piece has one of its legs overlapping the leg of the other clamping piece on the outside.

3. The clamping device of claim 1 wherein the clamping pieces are matched end-for-end.

4. The clamping device of claim 1 wherein the anchoring means and slide means are mounted to the outside of the clamping pieces.

5. The clamping device of claim 1 wherein the juncture of the overlapped legs is such that the slide means mounted thereon are no further from the center of the clamping area than the remainder of the clamping device.

6. The clamping device of claim 1 wherein the slide means comprises a stationary sleeve having a forward projection overlapping and bearing against the forward edges of the overlapped clamping pieces and a slot opening in the sleeve extending essentially parallel to the clamp axis, a threaded traveling nut traveling in the stationary sleeve having projections extending through the slot opening in the sleeve and through each of the respective registering slots.

7. A clamping device for securing an instrument to a mounting panel comprising:
   two generally L-shaped clamping pieces surrounding a clamping area, each of the clamping pieces having two legs forming respective dihedral angles at an apex of the juncture of the leg, with one of the legs of each clamping piece having an elongated slot therethrough extending essentially parallel to the clamp axis, the legs of the two clamping pieces having overlapping free end portions arranged such that the dihedral angles face one another in spaced relation and the free end portions are received through the elongated slots of each of the clamping pieces,
   elongated registering pairs of slots in each of the overlapping portions of the legs extending at cross angles to one another and not parallel with the clamp axis,
   a pair of slide means arranged to move endwise parallel to the clamp axis, one mounted adjacent each registering pair of slots having projections extending through each of the respective registering slots whereby endwise movement of each of the slide means and projections essentially parallel to the clamp axis exerts two simultaneous camming actions at spaced apart locations to vary the overlap of the legs and thereby vary the size of the clamping area,
   anchoring means for anchoring the clamping pieces to a mounting plate, and
   adjusting screw means threadedly connected to the slide means through the mounting plate for selectively moving the same endwise.

\* \* \* \* \*